United States Patent
Schumacher et al.

(10) Patent No.: US 9,961,893 B1
(45) Date of Patent: May 8, 2018

(54) COLLAPSIBLE ANIMAL DECOY

(71) Applicants: Theodore R. Schumacher, Berlin, WI (US); Daniel S. Schumacher, Wild Rose, WI (US)

(72) Inventors: Theodore R. Schumacher, Berlin, WI (US); Daniel S. Schumacher, Wild Rose, WI (US)

( * ) Notice: Subject to any disclaimer, the term of this patent is extended or adjusted under 35 U.S.C. 154(b) by 198 days.

(21) Appl. No.: 15/137,029

(22) Filed: Apr. 25, 2016

Related U.S. Application Data (60) Provisional application No. 62/152,992, filed on Apr. 27, 2015.

(51) Int. Cl.
  *A01M 31/06* (2006.01)
  *F16M 11/04* (2006.01)
  *F16M 13/02* (2006.01)

(52) U.S. Cl.
  CPC ............ *A01M 31/06* (2013.01); *F16M 11/04* (2013.01); *F16M 13/02* (2013.01)

(58) Field of Classification Search
  CPC .................................................. A01M 31/06
  USPC ............................................................ 43/2, 3
  See application file for complete search history.

(56) References Cited

U.S. PATENT DOCUMENTS

| | | | | |
|---|---|---|---|---|
| 547,032 A | * | 10/1895 | Ross ..................... | A01M 31/06 43/3 |
| 812,499 A | * | 2/1906 | Johnston ............... | A01M 31/06 43/3 |
| 833,966 A | * | 10/1906 | Johnston ............... | A01M 31/06 43/3 |
| 970,003 A | * | 9/1910 | Wethall ................ | A01M 31/06 43/3 |
| 1,933,844 A | * | 11/1933 | Davis .................... | A01M 31/06 43/3 |
| 2,246,574 A | * | 6/1941 | Coe ....................... | A01M 31/06 43/3 |
| 2,439,167 A | * | 4/1948 | Jackson ................ | A01M 31/06 43/3 |
| 2,545,800 A | * | 3/1951 | Viken ................... | A01M 31/06 43/3 |
| 2,812,608 A | * | 11/1957 | Jones .................... | A01M 31/06 43/3 |

(Continued)

FOREIGN PATENT DOCUMENTS

| | | | | |
|---|---|---|---|---|
| FR | 1436463 A | * | 4/1966 | ............ A01M 31/06 |
| GB | 383031 A | * | 11/1932 | ............ A01M 31/06 |
| GB | 1308253 A | * | 2/1973 | ............ A01M 31/06 |

*Primary Examiner* — Darren W Ark
(74) *Attorney, Agent, or Firm* — Donald J. Ersler (57) ABSTRACT

A collapsible animal decoy preferably includes a support frame and a flexible animal cover. The support frame preferably includes a pair of support rings, a pair of scissors extensions, a neck extension, and a pair of detachable legs. Each support ring includes a pair of T-connectors, a pair perimeter strips and a support tube. Each scissors extension preferably includes at least two scissors members. One end of the scissors extension is secured to the first support ring and the other end is secured to the second support ring. One end of the neck extension is pivotally retained on the support tube of the first support ring. Each detachable leg preferably includes a first leg section, a second leg section and an elastic string. The flexible animal cover includes a graphic of some animal, such as a deer formed on an exterior thereof.

19 Claims, 8 Drawing Sheets

(56) References Cited

U.S. PATENT DOCUMENTS

| | | | | |
|---|---|---|---|---|
| 3,470,645 A * | 10/1969 | Mattson | A01M 31/06 | 43/3 |
| 4,120,110 A * | 10/1978 | Aeschliman | A01M 31/06 | 43/3 |
| 4,535,560 A * | 8/1985 | O'Neil | A01M 31/06 | 43/3 |
| 4,590,699 A * | 5/1986 | Nicks | A01M 31/06 | 43/2 |
| 4,829,694 A * | 5/1989 | Oasheim | A01M 31/025 | 135/121 |
| 5,572,824 A * | 11/1996 | Szolis | A01M 31/06 | 43/3 |
| 5,595,012 A * | 1/1997 | Coleman | A01M 31/06 | 43/3 |
| 5,943,807 A * | 8/1999 | McPherson | A01M 31/06 | 43/2 |
| 6,216,382 B1 * | 4/2001 | Lindaman | A01M 31/06 | 248/156 |
| 6,296,005 B1 * | 10/2001 | Williams | A01M 31/025 | 135/901 |
| 6,374,530 B1 * | 4/2002 | Mierau | A01M 31/06 | 43/2 |
| 6,385,895 B1 * | 5/2002 | Scaries | A01M 31/06 | 43/2 |
| 6,769,954 B2 * | 8/2004 | Su | A63H 13/00 | 40/414 |
| 7,096,875 B2 * | 8/2006 | Dubinsky-Witkowski | A45B 11/00 | 135/16 |
| 7,788,839 B2 * | 9/2010 | McPherson | A01M 31/06 | 43/2 |
| 7,828,003 B2 * | 11/2010 | Montecucco | A01M 31/025 | 135/117 |
| 8,087,199 B2 * | 1/2012 | Roe | A01M 31/06 | 43/2 |
| 8,703,254 B2 * | 4/2014 | Kinderman | G09F 19/00 | 40/411 |
| 8,887,433 B2 * | 11/2014 | Luttrull | A01M 31/06 | 43/2 |
| 8,925,240 B2 * | 1/2015 | Beal | A01M 31/06 | 43/2 |
| 9,402,386 B1 * | 8/2016 | Otwell | A01M 31/06 | |
| 9,622,468 B2 * | 4/2017 | Downard | A01M 31/06 | |
| 9,693,550 B2 * | 7/2017 | Jones | A01M 31/06 | |
| 2009/0249678 A1 * | 10/2009 | Arnold | A01M 31/06 | 43/2 |

\* cited by examiner

COLLAPSIBLE ANIMAL DECOY

CROSS-REFERENCES TO RELATED APPLICATIONS

This is a utility patent application taking priority from provisional application No. 62/152,992 filed on Apr. 27, 2015.

BACKGROUND OF THE INVENTION

Field of the Invention

The present invention relates generally to hunting and more specifically to a collapsible animal decoy, which allows an animal decoy to be stored in a tight space.

Discussion of the Prior Art

U.S. Pat. No. 5,595,012 to Coleman discloses a bird decoy. U.S. Pat. No. 5,943,807 to McPherson discloses a folding large game decoy. U.S. Pat. No. 8,703,254 to Kinderman discloses an adaptable three-dimensional ornamental wire frame model.

Accordingly, there is a clearly felt need in the art for a collapsible animal decoy, which allows a decoy to be stored in a tight space.

SUMMARY OF THE INVENTION

The present invention provides a collapsible animal decoy, which allows a decoy to be stored in a tight space. The collapsible animal decoy preferably includes a support frame and a flexible animal cover. The support frame preferably includes a pair of support rings, a pair of scissors extensions, a neck extension and a pair of detachable legs. Each support ring includes a pair of T-connectors, a pair perimeter strips and a support tube. Each T-connector includes a tube leg, a first strip leg and a second strip leg. The first strip leg is formed on one end of the T-connector and the second strip leg is formed on an opposite end of the T-connector. The tube leg is formed perpendicular to the first and second strip legs. A tube cavity is formed in the tube leg; a first strip cavity is formed in the first strip leg; and a second strip cavity is formed in the second strip leg. The tube cavity is sized to receive an end of the support tube. The first strip and second strip cavities are sized to receive an end of the perimeter strip. Each support ring is assembled by inserting fasteners, such as rivets through the tube leg, first strip and second strip legs to retain the tube and the pair of perimeter strips in the pair of T-connectors.

The scissors extension preferably includes at least two scissors members, a biasing device and a pair of slide rings. Each scissors member includes a first pivot leg and a second pivot leg. A middle of the first pivot leg is pivotally secured to a middle of the second pivot leg. One end of the first and second pivot legs are pivotally secured to one end of the first and second pivot legs of an adjacent scissors member. An opposing end of the first pivot leg of a first scissors member is pivotally secured to substantially a top of the support tube of a first support ring. An opposing end of the first pivot leg of a second scissors member is pivotally secured to substantially a top of the support tube of a second support ring. A first slide ring is slidably engaged with the support tube of the first support ring. A second slide ring is slidably engaged with the support tube of the second support ring. An opposing end of the second pivot leg of the first scissors member is pivotally secured to the first slide ring. An opposing end of the second pivot leg of the second scissors member is pivotally secured to the second slide ring. The biasing device is preferably an extension spring or the like. The extension spring is secured adjacent the pivot point of the first and second scissor members.

One end of the neck extension is pivotally retained on substantially a top of the support tube of one of the support rings. Each detachable leg preferably includes a first leg section, a second leg section and an elastic string. Each leg section includes a tubular cross section and an extension plug. The extension plug extends from one end of the leg section. The extension plug is sized to be firmly received by an opposing end of the leg section. The first leg section includes an attachment flange and a leg portion. The attachment flange is formed by crushing an upper portion of the leg portion to form a flat thickness. One end of the elastic string is attached to the extension plug of the first leg section; the elastic string is inserted through the second leg section; and secured to the extension plug of the second leg section. The attachment flange of the first leg section is pivotally secured to substantially a top of the support tube of the first or second support rings. The flexible animal cover includes a graphic of an animal, such as a deer formed on an exterior thereof. The support frame is sized to receive flexible animal cover.

Accordingly, it is an object of the present invention to provide a collapsible animal decoy, which allows a decoy to be stored in a tight space.

These and additional objects, advantages, features and benefits of the present invention will become apparent from the following specification.

DETAILED DESCRIPTION OF THE PREFERRED EMBODIMENTS

Figure 1:
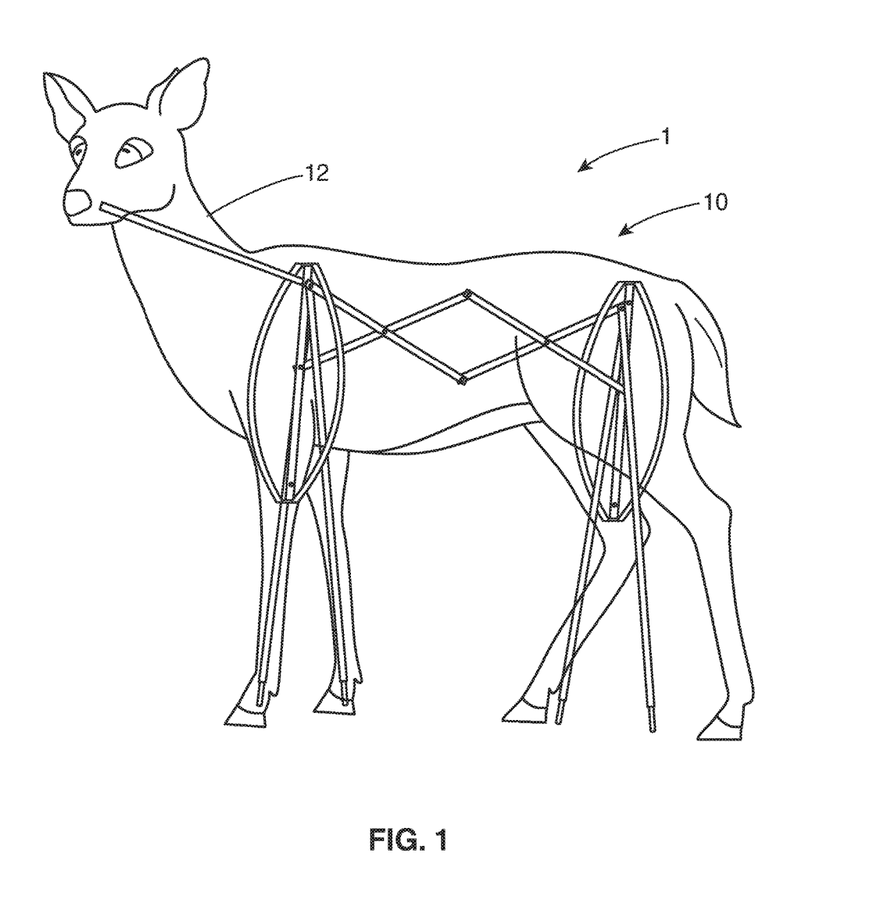
FIG. 1 is a perspective view of a collapsible animal decoy in accordance with the present invention.
Figure 2:
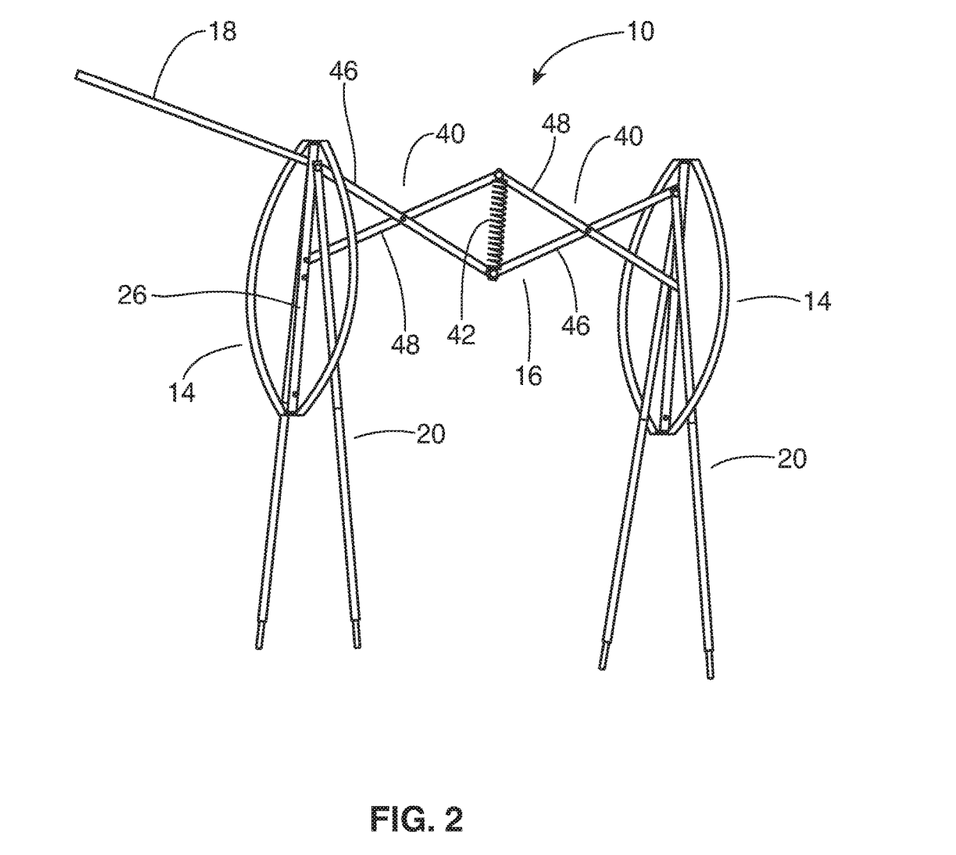
FIG. 2 is a perspective view of a support frame of a collapsible animal decoy in accordance with the present invention.
Figure 3:
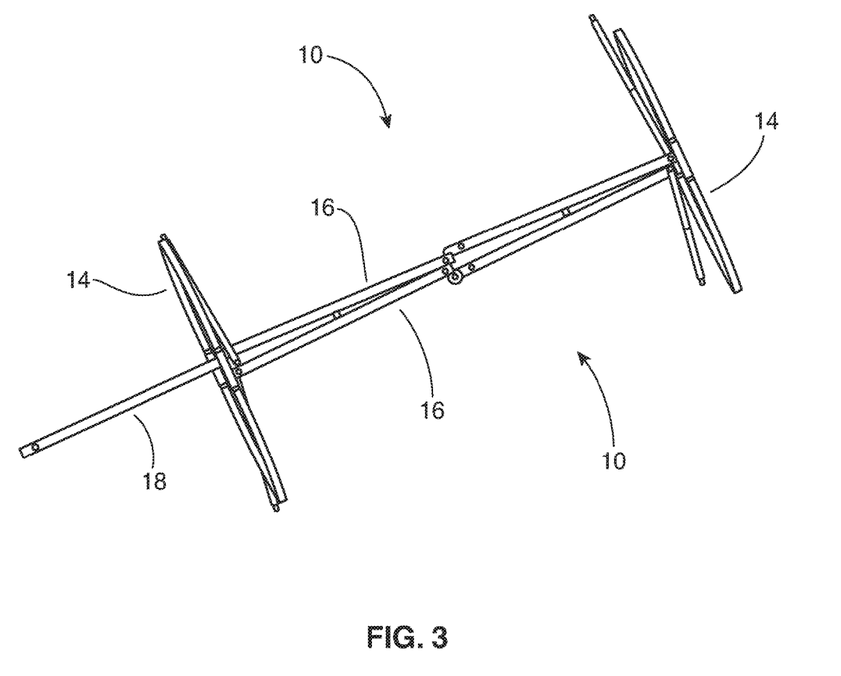
FIG. 3 is a top view of a support frame of a collapsible animal decoy in accordance with the present invention.

With reference now to the drawings, and particularly to FIG. 1, there is shown a perspective view of a collapsible animal decoy 1. With reference to FIGS. 2-3, the collapsible animal decoy 1 preferably includes a support frame 10 and a flexible animal cover 12. The support frame 10 preferably includes a pair of support rings 14, a pair of scissors extensions 16, a neck extension 18 and a pair of detachable legs 20. With reference to FIGS. 5-8, each support ring 14 includes a pair of T-connectors 22, a pair of perimeter strips 24 and a support tube 26. Each perimeter strip 24 includes a curved portion 25 and two straight insertion portions 27 extending from opposing ends of the curved portion 25. An insertion plug 29 extends from each end of the support tube 26. Each T-connector 22 includes a tube leg 28, a first strip leg 30 and a second strip leg 32. The first strip leg 30 is formed on one end of the T-connector 22 and the second strip leg 32 is formed on an opposite end of the T-connector 22. The tube leg 28 is formed perpendicular to the first and second strip legs 30, 32. A tube cavity 34 is formed in the tube leg 28; a first strip cavity 36 is formed in the first strip leg 30; and a second strip cavity 38 is formed in the second strip leg 32. The tube cavity 34 is sized to receive the insertion plug 29 of the support tube 26. The first strip and second strip cavities 36, 38 are sized to receive the straight insertion portions 27 of the perimeter strip 24. Each support ring 14 is assembled by inserting fasteners, such as rivets through the tube leg 28 to retain the support tube 26; and the first and second strip legs 30, 32 to retain the perimeter strips 24 in the strip legs 30, 32.

Figure 8:
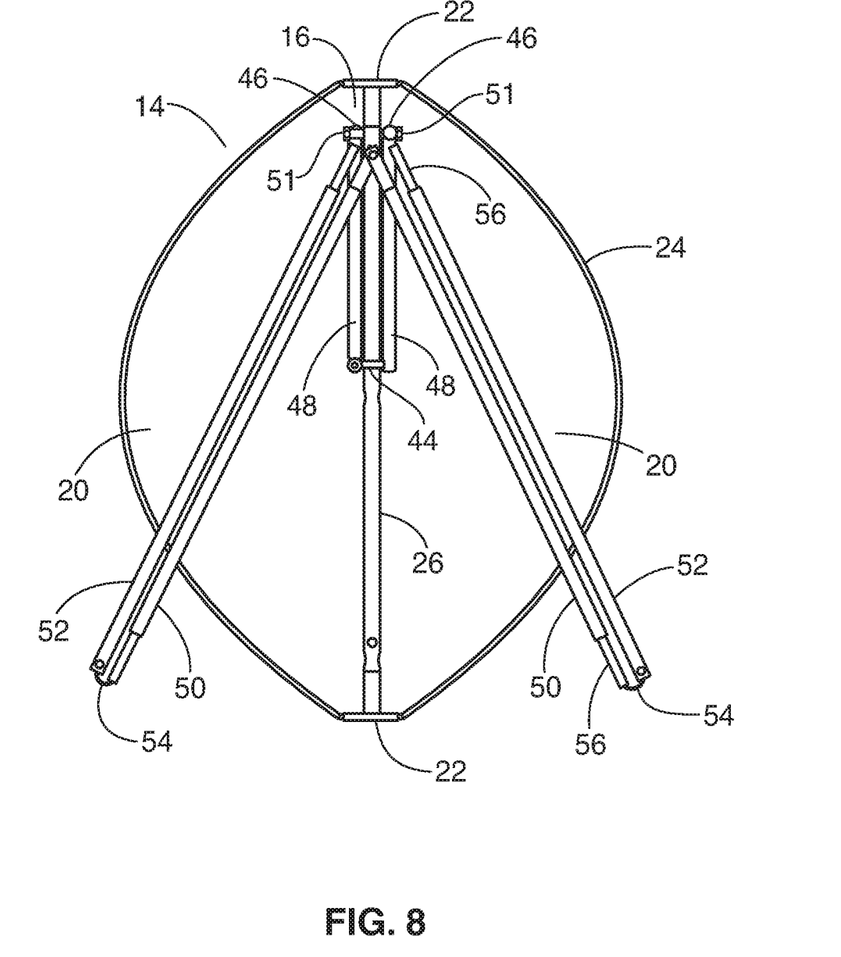
FIG. 8 is a front view of a support ring with a pair of detachable legs pivotally attached thereto and a scissors extension retained thereon of a collapsible animal decoy in accordance with the present invention.

Each scissors extension 16 preferably includes at least two scissors members 40, a biasing device 42 and a pair of slide rings 44. Each scissors member 40 includes a first pivot leg 46 and a second pivot leg 48. A middle of the first pivot leg 46 is pivotally secured to a middle of the second pivot leg 48. One end of the first and second pivot legs 46, 48 are pivotally secured to one end of the first and second pivot legs 46, 48 of an adjacent scissors member 16. An opposing end of the first pivot leg of the first scissors member 40 is pivotally secured to substantially a top of the support tube 26 of the first support ring 14 with a fastener 51 or the like. An opposing end of the first pivot leg 46 of the second scissors member 40 is pivotally secured to substantially a top of the support tube 26 of the second support ring 14 with the fastener 51 or the like.

The first slide ring 44 is slidably engaged with the support tube 26 of the first support ring 14. A second slide ring 44 is slidably engaged with the support tube 26 of the second support ring 14. An opposing end of the second pivot leg 48 of the first scissors member 40 is pivotally secured to the first slide ring 44. An opposing end of the second pivot leg 48 of the second scissors member 40 is pivotally secured to the second slide ring 44. The biasing device 42 is preferably an extension spring, but could be any other suitable biasing device. One end of the extension spring 42 is secured adjacent the pivot point of the first pivot legs 46. The other end of the extension spring 42 is secured adjacent the pivot point of the second pivot legs 48. The extension spring 42 biases the scissors member into an extended orientation, such that the collapsible animal decoy 1 is in an extended or use position.

Figure 4:
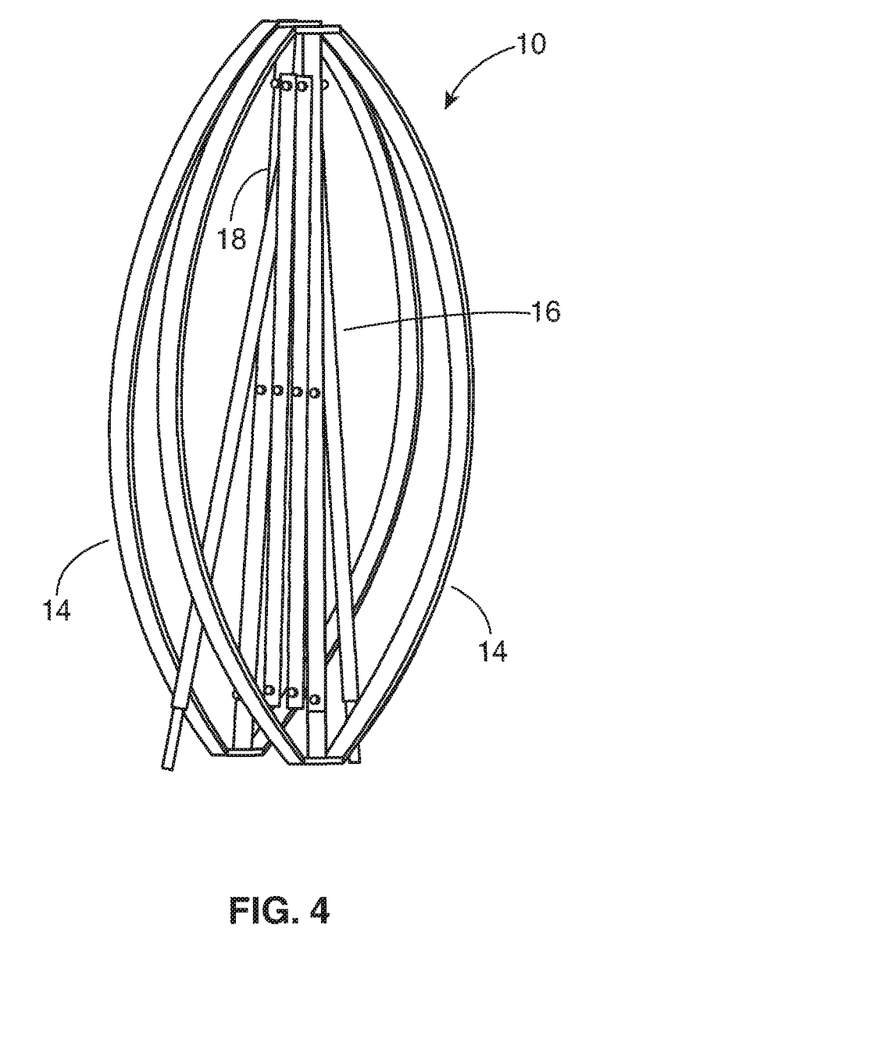
FIG. 4 is a perspective view of a retracted support frame of a collapsible animal decoy in accordance with the present invention.
Figure 5:
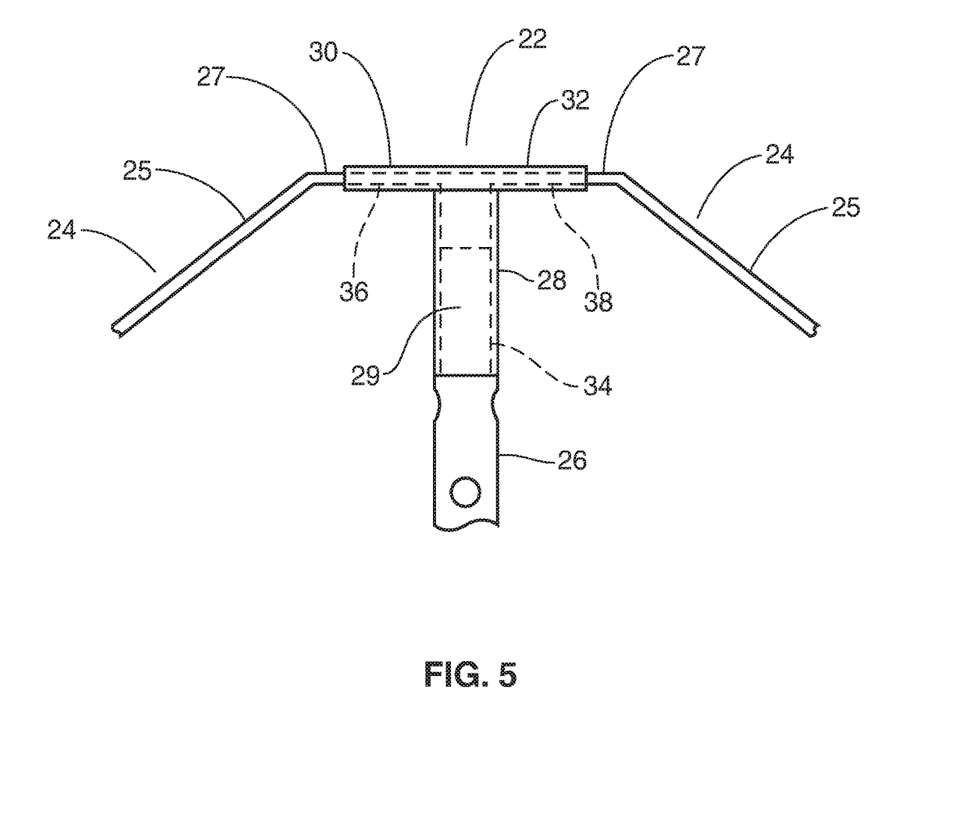
FIG. 5 is an enlarged front view of a T-connector of a collapsible animal decoy in accordance with the present invention.
Figure 6:
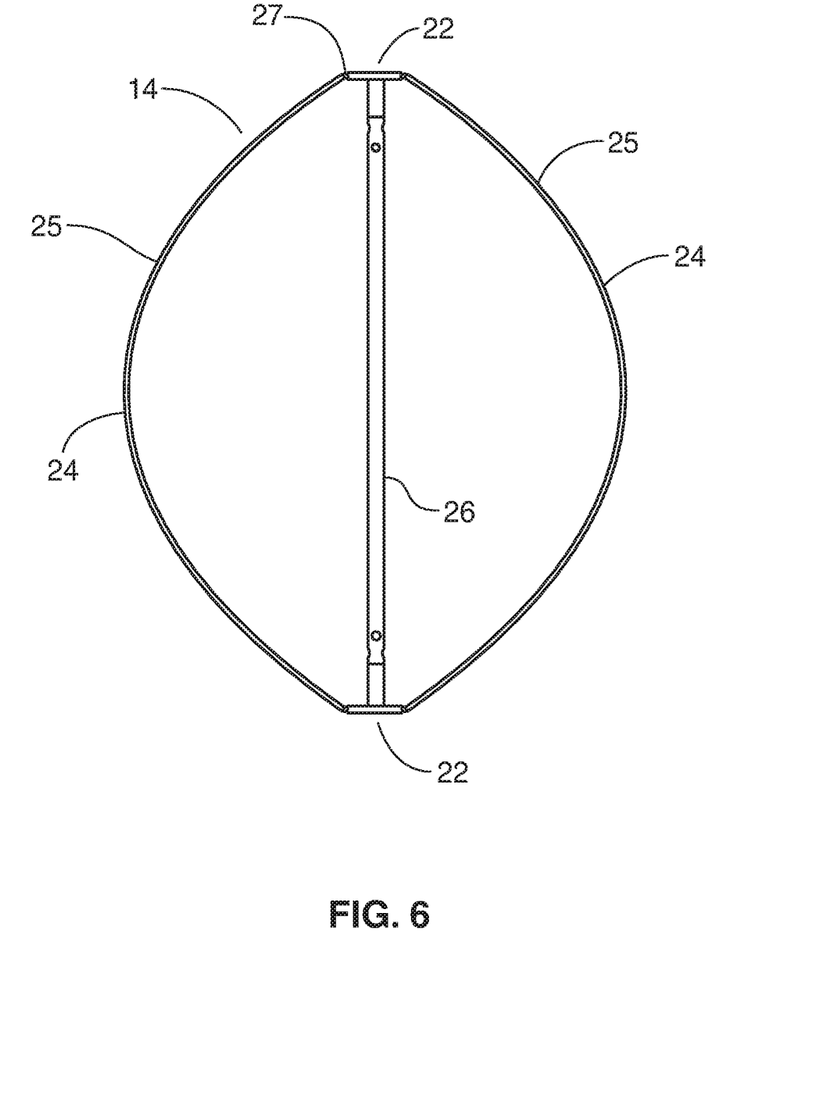
FIG. 6 is a front view of a support ring of a collapsible animal decoy in accordance with the present invention.
Figure 7:
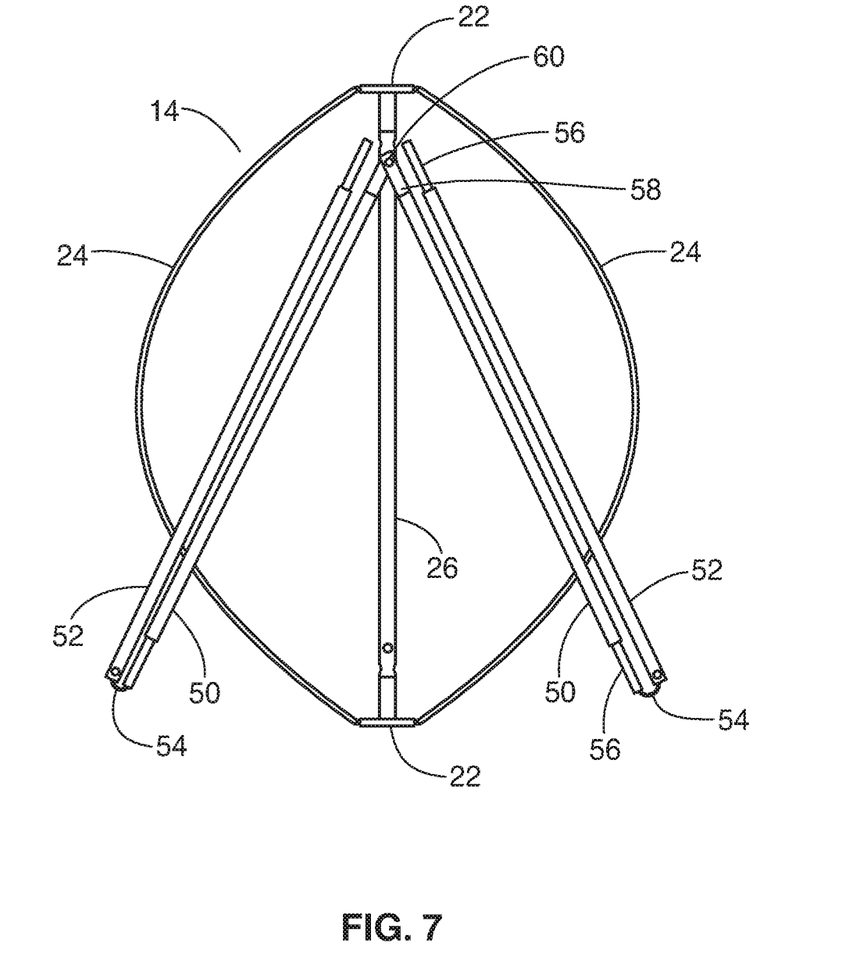
FIG. 7 is a front view of a support ring with a pair of detachable legs pivotally attached thereto of a collapsible animal decoy in accordance with the present invention.

One end of the neck extension 18 is pivotally retained on substantially a top of the support tube 26 of the first support ring 14. Each detachable leg preferably includes a first leg section 50, a second leg section 52 and an elastic string 54. Each leg section 50, 52 includes a tubular cross section and an extension plug 56. The extension plug 56 extends from one end of the first leg section 50. The extension plug 56 is sized to be firmly received by an opposing end of the second leg section 52. The first leg section 50 includes an attachment flange 58. The attachment flange 58 is formed by crushing an upper portion of the first leg section 50 to form a flat thickness. One end of the elastic string 54 is attached to the extension plug 56 of the first leg section 50; the elastic string 54 is inserted through the second leg section 52; and secured to the extension plug 56 of the second leg section 52. The attachment flange 58 of the first leg section 50 is pivotally secured to substantially a top of the support tube 26 of the first and second support rings 14 with a fastener 60. The flexible animal cover 12 includes a graphic of an animal, such as a deer formed on an exterior thereof. The support frame 10 is sized to receive flexible animal cover 12. With reference to FIG. 4, the support frame 10 may be retracted for storage or extended for use as a decoy by retracting or extending the scissors extension 16. All pivotal connections are made with a fastener, such as a threaded fasteners, pins, rivets or any other suitable fastener.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A collapsible animal decoy comprising:
   a first support ring;
   a second support ring;
   a scissors extension having an extended orientation and a retracted orientation, said scissors extension includes a first scissors member and a second scissors member, one end of said first scissors member is pivotally engaged with one end of said second scissors member, an opposing end of said first scissors member is pivotally and slidably retained on said first support ring, an opposing end of said second scissors member is pivotally and slidably retained on said second support ring; and
   at least two first legs extend from first support ring, at least two second legs extend from said second support ring.

2. The collapsible animal decoy of claim 1 wherein:
   said first and second support rings each include a pair of T-connectors, a pair of perimeter strips and a support tube, each end of said support tube is retained in a respective one of said pair of T-connectors, each end of said pair of perimeter strips is retained in a respective one of said pair of T-connectors.

3. The collapsible animal decoy of claim 2 wherein:
   said scissors extension includes a biasing device, said biasing device is secured to said one ends of said first and second scissors members to bias said scissors extension into the extended orientation.

4. The collapsible animal decoy of claim 2 wherein:
   each one of said first and second scissors members includes a first pivot leg and a second pivot leg, a middle of said first pivot leg is pivotally secured to a middle of said second pivot leg, said first pivot leg is pivotally engaged with a respective one of said support tubes, said second pivot leg is slidably engaged with said respective one of said support tubes.

5. The collapsible animal decoy of claim 4 wherein:
   said second pivot leg is slidably engaged with said respective one of said support tubes with a slide ring.

6. The collapsible animal decoy of claim 2 wherein:
   said at least two first and second legs each include a first leg section, a second leg section and an elastic string, said first and second leg sections are tethered to each other with said elastic string.

7. The collapsible animal decoy of claim 1 wherein:
a flexible animal cover includes a graphic of an animal, said flexible animal cover is supported by said first and second support rings.

8. A collapsible animal decoy comprising:
a first support ring;
a second support ring;
a scissors extension having an extended orientation and a retracted orientation, said scissors extension includes a first scissors member and a second scissors member, one end of said first scissors member is pivotally engaged with one end of said second scissors member, an opposing end of said first scissors member is pivotally and slidably retained on said first support ring, an opposing end of said second scissors member is pivotally and slidably retained on said second support ring;
at least two first legs extend from said first support ring, at least two second legs extend from said second support ring; and
a flexible animal cover includes a graphic of an animal, said flexible animal cover is supported by said first and second support rings.

9. The collapsible animal decoy of claim 8 wherein:
said first and second support rings each include a pair of T-connectors, a pair of perimeter strips and a support tube, each end of said support tube is retained in a respective one of said pair of T-connectors, each end of said pair of perimeter strips is retained in a respective one of said pair of T-connectors.

10. The collapsible animal decoy of claim 9 wherein:
said scissors extension includes a biasing device, said biasing device is secured to said one ends of said first and second of said at least two scissors members to bias said scissors extension into the extended orientation.

11. The collapsible animal decoy of claim 10 wherein:
each one of said first and second scissors members includes a first pivot leg and a second pivot leg, a middle of said first pivot leg is pivotally secured to a middle of said second pivot leg, said first pivot leg is pivotally engaged with a respective one of said support tubes, said second pivot leg is slidably engaged with said respective one of said support tubes.

12. The collapsible animal decoy of claim 11 wherein:
said second pivot leg is slidably engaged with said respective one of said support tubes with a slide ring.

13. The collapsible animal decoy of claim 10 wherein:
said at least two first and second legs each include a first leg section, a second leg section and an elastic string, said first and second leg sections are tethered to each other with said elastic string.

14. A collapsible animal decoy comprising:
a first support ring;
a second support ring;
a scissors extension having an extended orientation and a retracted orientation, said scissors extension includes a first scissors member and a second scissors member, one end of said first scissors member is pivotally engaged with one end of said second scissors member, an opposing end of said first scissors member is pivotally and slidably retained on said first support ring, an opposing end of said second scissors member is pivotally and slidably retained on said second support ring;
at least two first legs extend from said first support ring, at least two second legs extend from said second support ring;
a neck extension having an elongated length, said neck extension extending outward from said first support ring; and
a flexible animal cover includes a graphic of an animal, said flexible animal cover is supported by said first and second support rings.

15. The collapsible animal decoy of claim 14 wherein:
said first and second support rings each include a pair of T-connectors, a pair of perimeter strips and a support tube, each end of said support tube is retained in a respective one of said pair of T-connectors, each end of said pair of perimeter strips is retained in a respective one of said pair of T-connectors.

16. The collapsible animal decoy of claim 15 wherein:
said scissors extension includes a biasing device, said biasing device is secured to said one ends of said first and second of said at least two scissors members to bias said scissors extension into the extended orientation.

17. The collapsible animal decoy of claim 16 wherein:
each one of said first and second scissors members includes a first pivot leg and a second pivot leg, a middle of said first pivot leg is pivotally secured to a middle of said second pivot leg, said first pivot leg is pivotally engaged with a respective one of said support tubes, said second pivot leg is slidably engaged with said respective one of said support tubes.

18. The collapsible animal decoy of claim 17 wherein:
said second pivot leg is slidably engaged with said respective one of said support tubes with a slide ring.

19. The collapsible animal decoy of claim 16 wherein:
said at least two first and second legs each include a first leg section, a second leg section and an elastic string, said first and second leg sections are tethered to each other with said elastic string.

* * * * *